(12) United States Patent
Adolf (10) Patent No.: US 11,003,814 B1
(45) Date of Patent: May 11, 2021

(54) OPTIMIZATION OF PHYSICAL DEVICES VIA ADAPTIVE FILTER TECHNIQUES

(71) Applicant: X Development LLC, Mountain View, CA (US)

(72) Inventor: Brian Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 217 days.

(21) Appl. No.: 16/419,804

(22) Filed: May 22, 2019

(51) Int. Cl.
*G06F 30/20* (2020.01)

(52) U.S. Cl.
CPC .................................. *G06F 30/20* (2020.01)

(58) Field of Classification Search
None
See application file for complete search history.

(56) References Cited

U.S. PATENT DOCUMENTS

| | | | |
|---|---|---|---|
| 4,677,677 A | 6/1987 | Eriksson | |
| 5,774,693 A | 6/1998 | Su et al. | |
| 6,738,358 B2 | 5/2004 | Bist et al. | |
| 6,772,076 B2 | 8/2004 | Yamamoto et al. | |
| 9,589,757 B1 | 3/2017 | Hannon et al. | |
| 2004/0225483 A1 | 11/2004 | Okoniewski et al. | |
| 2010/0312539 A1 | 12/2010 | Yamagajo et al. | |
| 2014/0365188 A1 | 12/2014 | Doerr | |
| 2016/0012176 A1 | 1/2016 | Liu et al. | |
| 2016/0033765 A1 | 2/2016 | Liu et al. | |
| 2016/0174902 A1 | 6/2016 | Georgescu et al. | |
| 2018/0018757 A1 | 1/2018 | Suzuki | |
| 2018/0045953 A1 | 2/2018 | Fan et al. | |

(Continued)

FOREIGN PATENT DOCUMENTS

| | | |
|---|---|---|
| WO | 2017/176370 A1 | 10/2017 |
| WO | 2017/223560 A1 | 12/2017 |

OTHER PUBLICATIONS

Chen, R.T. et al., "Neural Ordinary Differential Equations", 32nd Conference on Neural Information Processing Systems (NIPS 2018), Oct. 22, 2018, 18 pages.

(Continued)

*Primary Examiner* — Steven M Christopher
(74) *Attorney, Agent, or Firm* — Christensen O'Connor Johnson Kindness PLLC (57) ABSTRACT

A technique for optimizing a physical device includes receiving an initial description of the physical device that describes the physical device with voxels that each describes one or more structural parameters of the physical device. The initial description includes a characterization including a desired output signal generated at an output region of the physical device in response to a source signal at a source region of the physical device. A field response is forward simulated from the source region to the output region to generate a forward simulated output signal. Structural parameter weights of the voxels are adjusted with an adaptive algorithm configured to reduce an error between the forward simulated output signal and the desired output signal. The structural parameters of the voxels are revised based upon the adjusting. The forward simulating, adjusting, and revising are iteratively repeated and a revised/optimized description of the physical device is generated.

22 Claims, 4 Drawing Sheets

(56) References Cited

U.S. PATENT DOCUMENTS

2020/0065446 A1\* 2/2020 Mackman ............... G06F 30/23
2020/0265328 A1\* 8/2020 Kaditz .................. G06N 5/046

OTHER PUBLICATIONS

Petykiewicz, J. et al., "Active Nanophotonics: Inverse Design and Strained Germanium Light Emitters", A Dissertation Submitted to the Department of Electrical Engineering and the Committee on Graduate Studies of Stanford University, October 2016. 134 pages.
Ying-Shou Lu, J., "Nanophotonic Computational Design", A Dissertation Submitted to the Department of Electrical Engineering and the Committee on Graduate Studies of Stanford University, Jun. 2013, 122 pages.
Piggott, A.Y., "Automated Design of Photonic Devices", A Dissertation Submitted to the Department of Electrical Engineering and the Committee on Graduate Studies of Stanford University, Jun. 2018, 112 pages.
Lu, J. et al., "Nanophotonic Computational Design", Optics Express, vol. 21, No. 11, Jun. 3, 2013, 17 pages.
Piggott, A.Y. et al., "Inverse Design and Implementation of a Wavelength Demultiplexing Grating Coupler", Scientific Reports, Nov. 27, 2014, 5 pages.
Piggott, A.Y. et al., "Inverse Design and Demonstration of a Compact and Broadband On-Chip Wavelength Demultiplexer", Nature Photonics, May 11, 2015, 5 pages.
Piggott, A.Y. et al., "Silicon Photonics: Design Approach to Integrated Photonics Explores Entire Space of Fabricable Devices", Laser Focus World, Aug. 13, 2018, 5 pages.
Piggott, A.Y. et al., "Fabrication-constrained Nanophotonic Inverse Design", Scientific Reports, May 11, 2017, 7 pages.
Su, L. et al., "Inverse Design and Demonstration of a Concept On-Chip Narrowband Three-Channel Wavelength Demultiplexer", ACS Photonics, Aug. 17, 2017, 6 pages.
Su, L. et al.,Fully-Automated Optimization of Grating Couplers, Optics Express, vol. 26, No. 4m Feb. 2018, 12 pages.
Robinson, J.T., "First-Principle Derivation of Gain in High-Index-Contrast Waveguides", Optics Express, vol. 16, No. 21, Oct. 13, 2008, 11 pages.
Lalau-Keraly, C.M. et al., "Adjoint Shape Optimization Applied to Electromagnetic Design", Optical Society of America, 2013, 9 pages.
Adaptive filter—Wikipedia, Retrieved from Internet <https://en.wikipedia.org/wiki/Apative_filter> on Oct. 29, 2018, 7 pages.
Adaptive optimization—Wikipedia, Retrieved from Internet <https://en.wikipedia.org/wiki/Apative_optimization> on Oct. 29, 2018, 1 page.
Wetter, M. et al., "Building design optimization using a convergent pattern search algorithm with adaptive precision simulations", Journal of Energy and Buildings vol. 37, No. 6, Jun. 1, 2005, 30 pages.

\* cited by examiner

OPTIMIZATION OF PHYSICAL DEVICES VIA ADAPTIVE FILTER TECHNIQUES

TECHNICAL FIELD

This disclosure relates generally to design optimization of physical devices, such as, but not limited to, electromagnetic devices.

BACKGROUND INFORMATION

Electromagnetic devices (e.g., optical devices, electrical devices, or otherwise) are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Conventional techniques for the design of these devices are sometimes determined through a simple guess and check method in which a small number of design parameters of a predetermined design are adjusted for suitability to a particular application. However, in actuality, these devices may have design parameters ranging from hundreds all the way to many billions, dependent on the device size and functionality. As functionality of electromagnetic devices is increased and manufacturing tolerances improve to allow for smaller device feature sizes, it becomes increasingly important to take full advantage of these improvements via optimized device design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system and method for design optimization of physical devices via adaptive filter techniques are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of a physics simulator utilized to optimize structural parameters (e.g., physical traits or characteristics) of electromagnetic and other devices based on first-principles simulations. In particular, the physics simulator allows for a first-principles based design and optimization of devices based on their optical, electrical, magnetic, acoustic, and/or fluidic response (e.g., field response) to an excitation source. The physics simulator utilizes physical partial-differential equation (PDE) systems to model these optical, electrical, mechanical, fluidic, quantum dynamic, and the like systems in a forward simulation, and optionally a reverse simulation as well, to determine the influence of changes in the structural parameters of the device on the field response and ultimately the output signal of the device. While these forward and/or reverse simulations are performed, one or more adaptive algorithms are used to adjust the structural parameters in a manner that reduces the error between a desired output signal of the device and the simulated output signal thereby optimizing the description and design of the physical device, in manners that may not be intuitive to a human.

The device is described using an N dimensional array (e.g., N=1, 2, 3, or more) of voxels that each describe one or more structural parameters (e.g., index of refraction, dielectric constant, permeability, or other relevant physical characteristics) of the physical device at a respective position or local in N dimensional space. The initial description of the physical device to be optimized is further provided with a characterization of a desired input/output relationship such as a desired output signal generated at an output region in response to a source signal at a source region. In various embodiments, operation of the device should be characterized by its field response to a source signal (e.g., source field) that generates an output signal (e.g., output field), and the source signal, field response, and output signal are characterized using PDEs.

The forward and reverse simulations of the physical device in the physics simulator can require large state datasets (e.g., the device being represented in three-dimensions, or other dimensionality, by a quantity of voxels ranging from hundreds all the way to many billions) and many simulation time steps (e.g., from hundreds to millions or billions of time steps) to simulate and optimize these devices using the PDE systems. Using conventional ad hoc and brute force techniques, these large stateful datasets may make the simulations and optimizations intractable, or nearly intractable, in terms of memory footprint and simulation time. Accordingly, embodiments described herein apply adaptive filter techniques to significantly reduce the number of time steps between each structural parameter optimization iteration. Additional compact bookkeeping techniques may also be used to reduce the dataset size per simulation time step.

To reduce the number of time steps between optimization iterations, the physical device may be continuously simulated from input to output (and/or output to input), while iterative and adaptive optimizations to the structural parameters are implemented. The influences of these changes are allowed to propagate to the output during the device simulations where those influences are fed into an adaptive algorithm that determines the next iteration of adjustments to those structural parameters. The changes in the structural parameters may cause transient responses (e.g., resonance or other oscillations). In one embodiment, these transients are allowed to relax below a threshold value before the next iteration of structural parameter adjustment. As the device is optimized during continuous simulation, the number of time-steps between optimization iterations may be reduced, in certain designs where the structural optimizations also serve to reduce the resonance factor of the device. These adaptive reductions in the number of time steps between each iteration further accelerates the overall simulation time for design optimization. However, in other design scenarios, the number of time steps between iterations need not correlate to the evolving resonance factor, Q, of the device under iterative design.

Yet another technique for accelerating design optimization is to run concurrent forward and reverse simulations that feedback into adaptive optimizations of the structural parameters of the voxels describing the physical device. With two feedback paths for design optimization, the design can converge to a final revised description in fewer simulation time steps. Yet additional optimizations may include continuously revising and updating the source signal of the reverse simulation using the forward simulated output signal.

In some embodiments, the memory footprint of the bookkeeping may be reduced by translating the field response into a reduced dimensionality representation. In other words, instead of storing the field response at every point in time of the simulations, only a single (e.g., combined) state of the simulation is stored. For example, rather than storing the field response for every voxel at every time point, the field response over time is represented in a different domain (e.g., via Fourier components at one or more frequencies of interest) that reduces the dimensionality required to store the field response. The reduced representation of the field response may correspond to decomposition components (e.g., Fourier components) extracted while performing the simulations. In one embodiment, the reduced representation is achieved by taking multiple time points (e.g., all simulation time points) and projecting them onto one or more Fourier components via multiplying by the complex exponential at those frequencies. To be even more aggressive with the compression, a decaying function may be leveraged by applying a moving window that "forgets" the effect of more distant time steps, since those may have corresponded to a time step when the physical structure of the device under design was substantially different. Generally, one can dampen on the time scale of the number of time steps between iterations to limit the influence of previous structures in the Fourier representation.

Figure 1:
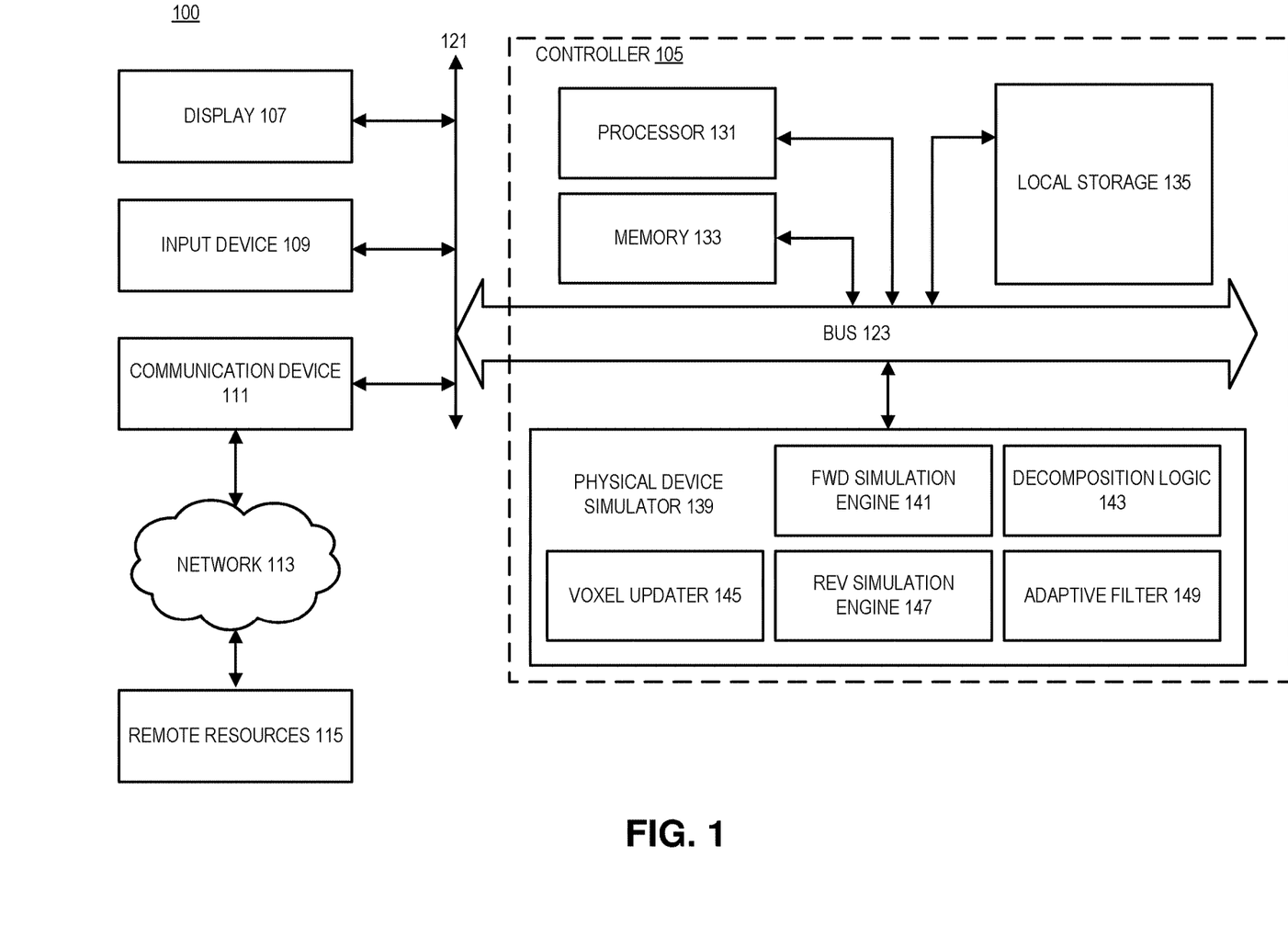
FIG. 1 is a functional block diagram illustrating a system for simulating and optimizing the design of a physical device, in accordance with an embodiment of the disclosure.

FIG. 1 is a functional block diagram illustrating system 100 for simulating and optimizing structural parameters of a physical device, in accordance with an embodiment of the disclosure. In the following embodiments, system 100 will be described in the context of simulating and optimizing an optical waveguide splitter as corresponding to the physical device. However, it is appreciated that the physical device is not limited to optical waveguides, and that other electromagnetic devices such as lasers, lenses, transistors, optical devices, quantum-dynamic devices, antennas, optoelectronic switches, mechanical structures, and the like may be represented by the term "physical device." The system 100 provides first-principles based design and optimization of physical devices based on their optical, electrical, magnetic, acoustic, and/or fluidic response (e.g., field response) to an excitation source. In other words, it is appreciated that system 100 is not limited to modeling electromagnetic devices and that other devices having a field response to an excitation source may also be modeled and their structural parameters optimized. As long as the equations that describe the excitation source(s), field response, and output fields are differentiable (e.g., described using partial differential equations), or any discontinuities can be filtered away, then the techniques described herein may be applied.

As illustrated, system 100 includes a controller 105, a display 107, input device(s) 109, communication device(s) 111, network 113, remote resources 115, a bus 121 and a bus 123. Controller 105 includes processor 131, memory 133, local storage 135, and a physical device simulator 139. Physical device simulator 139 includes forward simulation engine 141, reverse simulation engine 147, decomposition logic 143, voxel updater 145, and adaptive filter 149. It is appreciated that in some embodiments, controller 105 may be a distributed system. Furthermore, system 100 is merely one demonstrative system architecture, and other device architectures may be used.

Controller 105 is coupled to display 107 via buses 121 and 123 for displaying information to a user utilizing system 100. Input device 109 is coupled to bus 123 through bus 121 for communicating information and command selections to processor 131. Input device 109 may include a mouse, trackball, keyboard, stylus, or other computer peripheral, to facilitate an interaction between the user and controller 105. In response, controller 105 may provide verification of the interaction through display 107.

Communication device 111 is provided for accessing remote resources 115 of a distributed system via network 113. Communication device 111 may include any of a number of networking peripheral devices such as those used for coupling to an Ethernet, token ring, Internet, or wide area network. Communication device 111 may further include a null-modem connection, or any other mechanism that provides connectivity between controller 105 and the outside world. Note that any or all of the components of system 100 illustrated in FIG. 1 and associated hardware may be used in various embodiments of the present disclosure. The remote resources 115 may be part of a distributed system and include any number of processors, memory, and other resources for optimizing the structural parameters of the electromagnetic device.

The controller 105 orchestrates the operation of the system 100 for optimizing the structural (e.g., physical) parameters of the physical device. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 135 (e.g., magnetic memory such as computer disk drives), and the physical device simulator 139 are coupled to each other through bus 123. Controller 105 includes software (e.g., instructions included in memory 133) and/or hardware logic (e.g., application specific integrated circuits, field-programmable gate arrays, and the like) that when executed by controller 105 causes the controller 105 or the system 100 to perform operations. The operations may be based on instructions stored within any one of, or a combination of, memory 133, local storage 135, physical device simulator 139, and remote resources 115 accessed through network 113. In one embodiment, physical device simulator 139 represents a software architecture that is stored within memory 133 or local storage 135 and executed by processor 131.

In the illustrated embodiment, the modules 141-149 of the physical device simulator 139 are utilized to optimize the structural parameters of the electromagnetic device. In some embodiments, system 100 optimizes the structural parameters of the physical device via, inter alia, simulations (e.g., forward and/or reverse simulations) that utilizes a finite-difference time-domain (FDTD) method to model the field response (e.g., both electric and magnetic). Forward simulation engine 141 provides instructions for performing forward simulations (e.g., field propagations originating at a source region and terminating at an output region) while reverse simulation engine 147 provides instructions for performing reverse simulations (e.g., field propagations originating at the output region and terminating at the source region). The simulations determine field responses of the simulated environment in response to excitation source(s). The decomposition logic 143 extracts decomposition components from the field response associated with a performance parameter (e.g., particular frequencies) of the physical device. Adaptive filter 149 is utilized to adaptively optimize weights applied to the structural parameters of the physical device to reduce a loss value or error between a desired output signal and a simulated output signal. In various embodiments, adaptive filter 149 may execute a recursive least squares algorithm, a least mean squared algorithm, or otherwise. Voxel updater 145 includes logic for updating the structural parameters associated with the voxels of the simulated environment based upon the changes in the weights generated by adaptive filter 149. Once voxel updater 145 revises a particular structural parameter, the dynamics of the physical device within the simulated environment are changed, which impacts the response field. The influences of these changes propagate outward from the given voxel (e.g., one voxel, multiple voxels, or a partial voxel at a time) per simulation time step.

Figure 2:
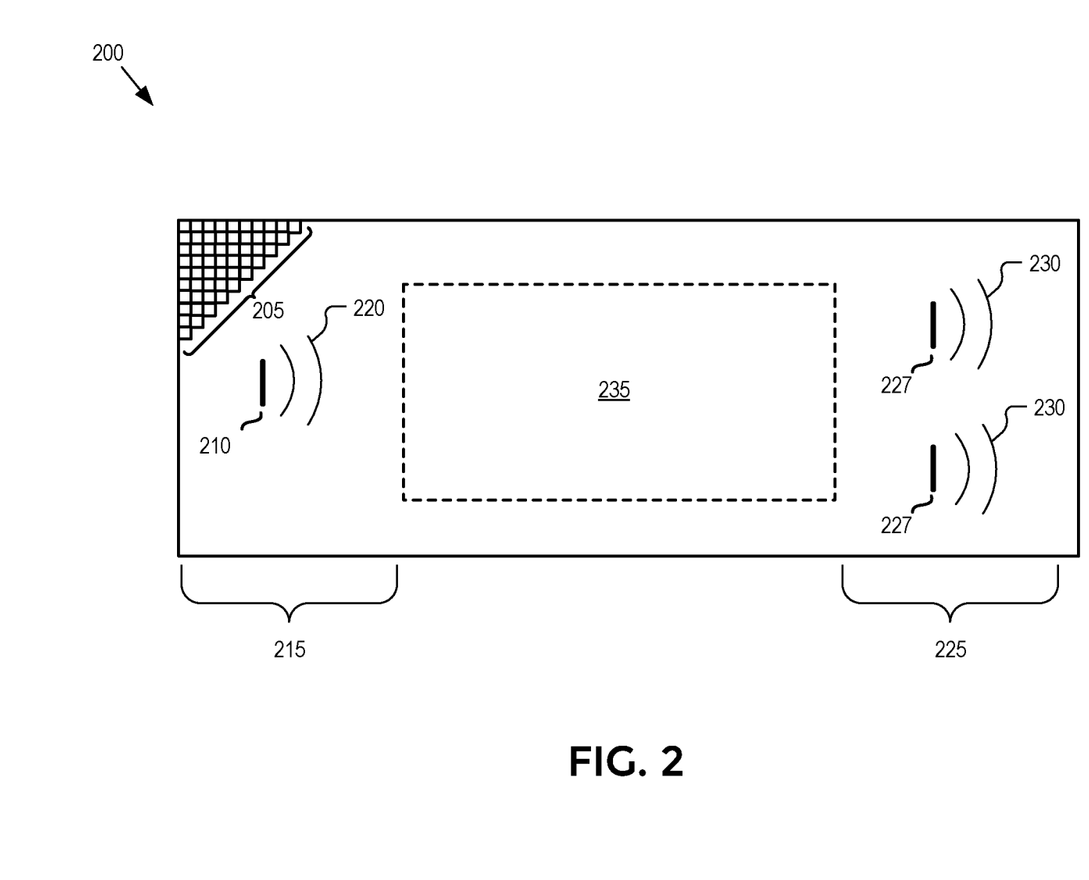
FIG. 2 illustrates a simulated environment of a physical device described using an array of voxels, in accordance with an embodiment of the disclosure.

FIG. 2 illustrates a simulated environment 200 of a physical device described using an array of voxels 205, in accordance with an embodiment of the disclosure. Simulated environment 200 may be achieved via a physics simulator such as that described by system 100 illustrated in FIG. 1. As illustrated, simulated environment 200 is represented in two-dimensions, however it is appreciated that higher (e.g., 3-dimensional space, or more) and lower (e.g., 1-dimensional space) dimensionality may also be used to describe simulated environment 200 and the physical device under test/design. Accordingly, voxels 205 are defined herein to represent or simulate the physical characteristics (e.g., structural parameters) of the simulated environment and the physical device at the coordinate/local/region they occupy whatever their dimensionality. In other words, voxels 205 may represent finite 3D volumes, in some embodiments, but may represent 2D pixels, 1D pixels, or greater than 3D dimensional volumes in other simulation embodiments. FIG. 2 only illustrates a portion of voxels 205 in the upper left corner of simulated environment 200 so as not to clutter the drawing; however, it should be appreciated that voxels 205 would be defined across the entire simulated environment 200 in practice.

As mentioned, voxels 205 describe one or more structural parameters of the physical device (note, in some instances simulated environment 200 may extend beyond the physical boundaries of the physical device under test, and therefore some voxels 205 may describe this surrounding environment), each at a respective location in N dimensional space. The structural parameters may include a variety of characteristics relevant to the propagation of the field response into and through the physical device being simulated. For example, each voxel 205 may define the dielectric constant, permeability, index of refraction, absorption coefficients, or otherwise of electromagnetic devices that operate via the propagation of electromagnetic fields. If the physical device operates using other types of field responses (e.g., acoustic waves, fluidic waves, etc.), then voxel 205 each describe the relevant characteristics for defining the structures that interact with and manipulate the fields being propagated. In the case of active physical devices, one or more of voxels 205 may also define one or more excitation sources, such as excitation source 210.

By defining the physical characteristics of the physical device that are relevant to the type of field response being generated, propagated, reflected, resonated, absorbed, amplified, or otherwise within simulated environment 200, operation of the physical device can be simulated, tested, altered, and then optimized. FIG. 2 illustrates an example electromagnetic device (e.g., waveguide splitter) having an excitation source 210 at a source region 215 that generates a source signal 220 and an output region 225 that outputs an output signal 230 (e.g., two separated wavefronts). The electromagnetic fields may be simulated using a finite-difference time-domain (FDTD) method to model the field response as an EM field or wave having electric and magnetic field components. In one embodiment, the field response is modeled using discretized Maxwell's Equations and Yee's Lattice methodology. In some embodiments, the field response is based, at least in part, on the structural parameters of voxels 205 and the excitation source(s) 210.

The initial description (un-optimized description) of the physical device not only includes the structural parameters of each voxel 205 but a characterization of a desired input/output relationship including a desired output signal generated at output region 225 in response to source signal 220 at source region 215. In the example of a waveguide splitter, the source signal 220 may be an external signal being coupled into the input of the waveguide splitter at source region 215. Source signal 220 may be a gaussian pulse, a sigmoid-ramp continuous wave, or otherwise. In the illustrated example, output region 225 includes two output ports 227 for emitting a split signal. The characterization of the desired input/output relationship, at least for the example of a waveguide splitter, may also define the desired wave modes and power in each mode output from each output port at output region 225. The desired input/output relationship provides the equations against which the adaptive algorithms are benchmarked for optimizing the structural parameters of voxels 205 during simulation. The initial description including its initial structural parameters may be user defined, or obtained/extracted from an off-the-shelf design of a physical device being optimized.

It should further be appreciated that the entire physical device need not be optimized. Rather, a specific region of interest or design region 235 may be the focus of optimization. In this scenario, only the structural parameters associated with voxels 205 disposed within design region 235 are adaptively adjusted during simulation time.

Figure 3:
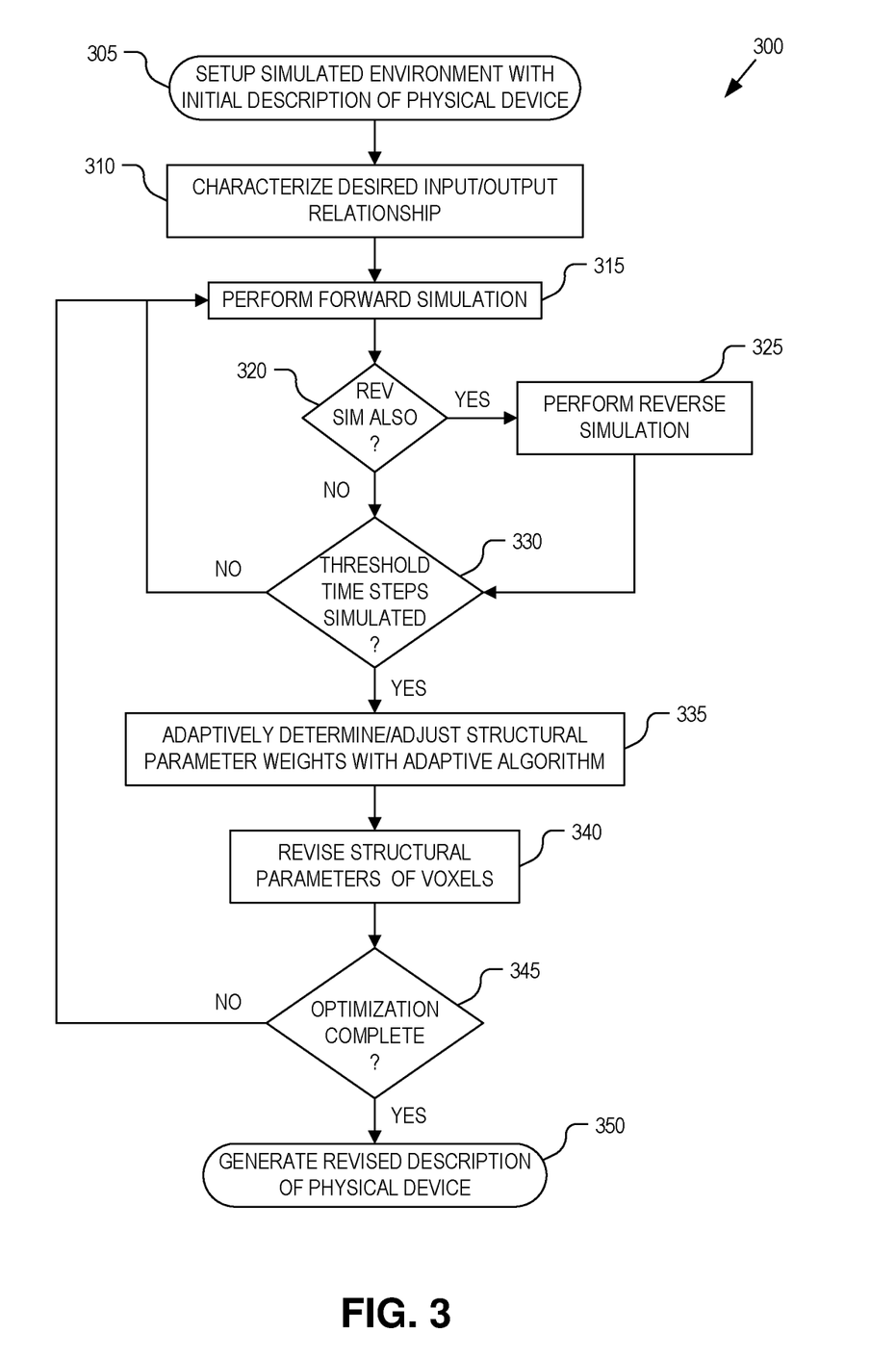
FIG. 3 is a flow chart illustrating a process for simulating a physical device and optimizing the design of the physical device with an adaptive algorithm, in accordance with an embodiment of the disclosure.

FIG. 3 is a flow chart illustrating a process 300 for simulating a physical device and optimizing the design of the physical device with an adaptive algorithm, in accordance with an embodiment of the disclosure. Process 300 is described with reference to FIG. 4. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, simulated environment 200A (see FIG. 4) is established with an initial description of the physical device. Simulated environment 200A represents a forward simulation setup of simulated environment 200. The initial description includes a description of the structural parameters of each voxel 205 along with a desired input/output relationship including a desired output signal generated at output region 225 in response to a source signal 220 at source region 215 (process block 310). In an embodiment that also includes a reverse simulation, a simulated environment 200B may also be established. Simulated environment 200B is similar to simulation environment 200A, except that the direction of field response propagation along with source and outputs are reversed. For example, a reverse source signal 420 may be the designed output signal fed backwards into output ports 227 at output region 225 and back propagated through design region 235 to source region 215 where a reverse simulated output signal 432 is monitored.

Figure 4:
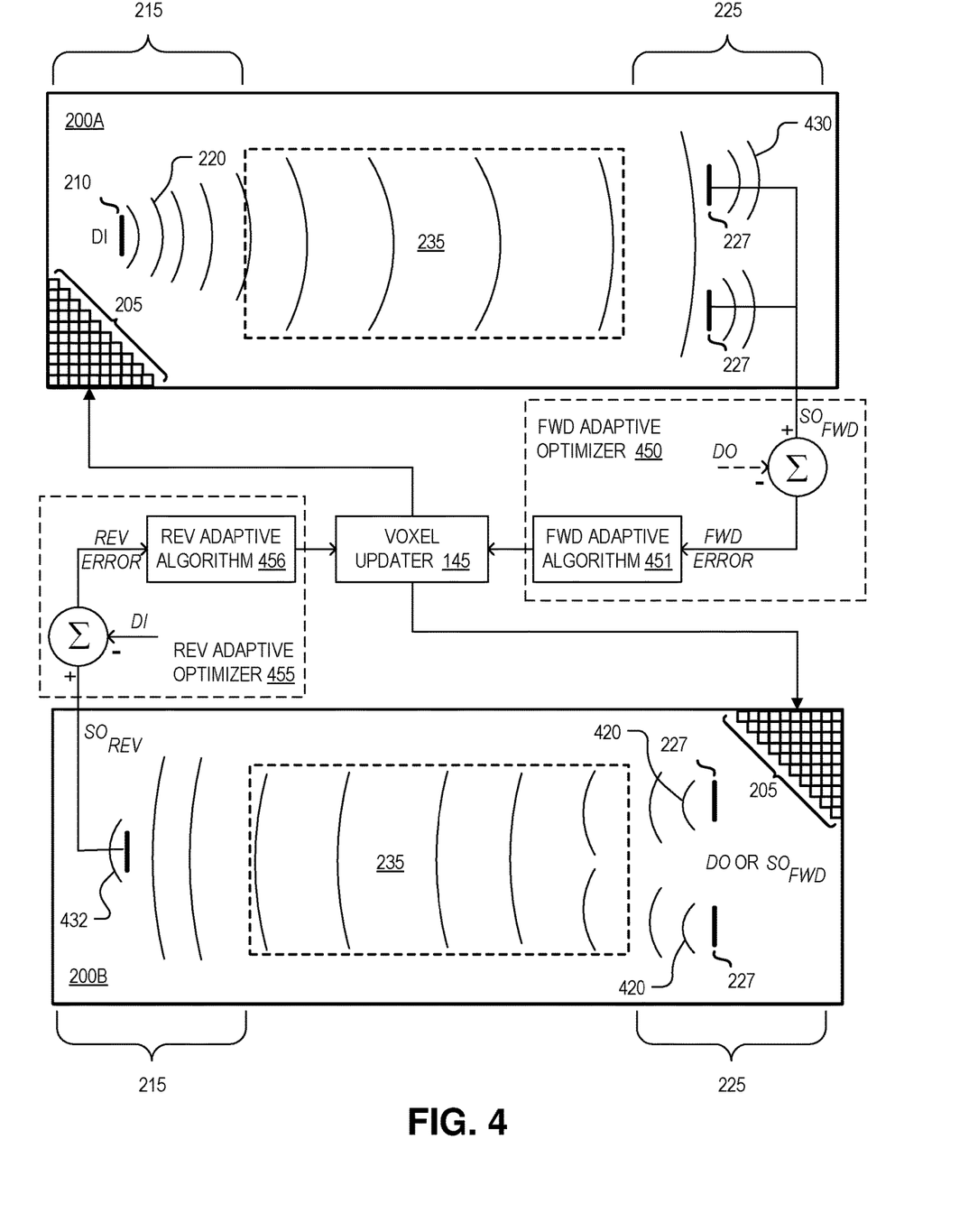
FIG. 4 illustrates optimization of an initial design description using forward and reverse simulations feeding back into adaptive algorithms, in accordance with an embodiment of the disclosure.

Once the initial forward simulated environment 200A (and optional reverse simulated environment 200B) have been setup and established (process block 305) within physical device simulator 139 and the desired input/output relationship characterized (process block 310), the simulations are commenced. In a process block 315, the forward simulation that generates a source signal 220 (e.g., source field) begins simulating each time step as source signal 220 propagates out from excitation source 210 as a simulated field response. For example, each time step of the forward simulation may represent (though not necessarily) the amount of time it takes for the field response to traverse one voxel 205. Accordingly, in this example, if the physical device is represented by 10,000 voxels 205 in length between excitation source 210 and output ports 227, then it would take 10,000 simulation time steps for the field response to first reach output ports 227. However, it should be appreciated that the time steps need only be small enough to give the field response a chance to propagate in a causal fashion. Thus, the time steps may be less than the time to traverse a single voxel to permit additional intra-voxel processing time, or each time step may include propagation across multiple voxels while maintaining sufficient causality.

If the optimization simulation includes a reverse simulation (decision block 320), then the corresponding reverse simulation is performed in process block 325. In one embodiment, the forward and reverse simulations are time-forward simulations performed in opposite directions through the simulated environments in parallel. In one embodiment, the bookkeeping for the FDTD calculations by forward simulation engine 141 and reverse simulation engine 147 are kept separate though structural parameter updates to voxels 205 by voxel updater 145 are shared. As mentioned above, in one embodiment, reverse source signal 420 may be a reverse directed version of the desired output signal from the characterization of the desired input/output relationship. In another embodiment, reverse source signal 420 is the difference between the desired output signal and the actual forward simulated output signal 430 output from the forward simulation. Since the forward simulated output signal 430 is a time varying value in this embodiment, reverse source signal 420 represents a time varying, reverse propagated error signal from the forward simulation.

As the forward and/or reverse simulations progress, the forward and reverse field responses have initial transient values that propagate and bounce around within the simulated environment in an oscillatory manner. The duration of these transient responses is related to the resonance or Q factor of the physical device being simulated. Accordingly, the number of time steps that it takes for the first field responses to reach output region 225 represents a minimum initial threshold number of time steps for useful data to reach output region 225 in the forward simulation (or source region 215 in the reverse simulation). In decision block 330, a threshold number of time steps is waited until adaptive filter 149 starts to receive useful feedback information from the simulations to commence adaptive feedback refinement of the structural parameters of voxels 205.

In one embodiment, adaptive filter 149 (see FIG. 1) includes a forward adaptive optimizer 450 (see FIG. 4), which operates as a feedback path for optimizing structural parameters of voxels 205 in response to the forward simulation. Adaptive filter 149 may also include a reverse adaptive optimizer 455 (see FIG. 4), which operates as another feedback path for optimizing the structural parameters of voxels 205 in response to the reverse simulation. Forward adaptive optimizer 450 includes a forward adaptive algorithm 451 that attempts to reduce the forward error signal, which is based upon combining (e.g., subtracting) forward simulated output signal ($SO_{FWD}$) 430 with the desired output signal (DO). Similarly, reverse adaptive optimizer 455 includes a reverse adaptive algorithm 456 that attempts to reduce the reverse error signal. In an embodiment where reverse source signal 420 is a reverse propagation of the desired output signal, the reverse error signal may be based upon combining reverse simulated output signal ($SO_{REV}$) 432 with the desired input signal (DI) (illustrated). In an embodiment where reverse source signal 420 is the forward error signal (e.g., the desired output signal subtract the forward simulated output signal 430 ($SO_{FWD}$)), then the reverse error signal may simply be reverse simulated output signal ($SO_{REV}$) 432 alone (i.e., subtract zero).

During the forward and/or the reverse simulations, the adaptive algorithms 451 and 456 operate continuously to reduce the forward and reverse error signals, respectively. Forward adaptive algorithm 451 and reverse adaptive algorithm 456 may implement the same algorithm or independent algorithms. Example adaptive algorithms that may be implemented include a recursive least squares algorithm, a least mean squared algorithm, or otherwise. Forward adaptive algorithm 451 and reverse adaptive algorithm 456 operate to adaptively determine and adjust weighting factors that are used to scale the structural parameters of the individual voxels 205 (process block 335). These weighting factors are referred to as structural parameter weights. The adaptive algorithm(s) may operate to adjust the structural parameter weight of just a single voxel 205 at a time, a subset of voxels 205 at a time, only voxels 205 located within design region 235 at a time, or all voxels 205 in parallel. Accordingly, the adaptive algorithm(s) may maintain and adjust an array of structural parameter weights associated with a corresponding group of voxels 205.

Once the structural parameter weights for a given iteration have been determined and adjusted by forward adaptive algorithm 451 and/or reverse adaptive algorithm 456 (process block 335), voxel updater 145 applies the weights to simulated environments 200A and/or 200B by revising the structural parameters of the corresponding voxels 205 (process block 340). In one embodiment, these changes are implemented between consecutive time steps in the simulations, which is akin to changing the material properties of the physical device at the specified locations at the speed of light. These changes create field response ripples that propagate out from the locations of the voxels being updated, and result in transient/resonant responses in the forward and reverse simulations. Accordingly, process 300 returns to process block 315 (and optionally 325) where the simulations continue for a threshold number of time steps (decision block 330) to allow the changes to sufficiently propagate out and affect $SO_{FWD}$ (forward simulation) and/or $SO_{REV}$ (reverse simulation).

Accordingly, the threshold number of time steps between each update iteration is influenced by the size of the physical device being simulated and the number of voxels 205 between the updated voxels and output region 225 (forward simulation) or source region 215 (reverse simulation). In other words, the number of time steps should be sufficient to allow influences from the revisions to propagate to $SO_{FWD}$, thereby affecting the forward error signal, or to propagate to $SO_{REV}$, thereby affecting the reverse error signal. Additionally, the number of time steps may further be dependent upon the resonance or Q factor of the physical device, since this dictates how long it will take for the transients to relax out of the simulated environments after a structural parameter revision. In one embodiment, the transient responses are compared to a threshold value to determine the number of time steps between a given revision iteration. As such, the number of time steps between each revision iteration may vary dependent upon the particular impact of a given structural parameter change. In general (i.e., when not specifically designing a resonator), the Q factor is expected to reduce as the simulations progress towards an optimized design, and as such, the number of simulation time steps between revision iterations would be expected to decrease as the optimization progresses. By watching when steady state is achieved (or nearly achieved) after a revision iteration, the dynamics (underlying Q factor) is empirically determined and the adaptive optimization algorithms can be made more aggressive (e.g., wait fewer simulation time steps until the next revision iteration), in that it can now approximately anticipate at least what some voxel changes will do to the output signal some time later. Thus, the contribution from those voxels become a known quantity more or less, allowing other voxel changes to be performed, measured, and characterized as well. Eventually, the number of time simulations between revision iterations can no longer be reduced, as doing so creates interrelated changes that can create instabilities in the adaptive algorithms 451 and/or 456.

Once the design of the physical device has been optimized to a point that either further optimizations are not progressing the forward simulated output signal towards the desired output signal, or the forward simulated output signal has achieved parity with the desired output signal, within a threshold difference, then the optimization iteration loop is determined to be complete (decision block 345), and the revised description of the physical device that incorporates all of the optimized structural parameter changes is generated (process block 350) and stored to memory 133 and/or local storage 135.

As mentioned above, the optimization may be performed solely based upon a forward simulation, based solely upon a reverse simulation, or based upon both the forward simulation and the reverse simulation. Using parallel forward and reverse simulations provides dual feedback paths for more quickly converging upon an optimized design. In yet another embodiment, the forward simulation output signal $SO_{FWD}$ may be used to feedback into the reverse simulation to potentially further accelerate convergence on an optimized design.

As mentioned above, the memory footprints associated with storing the coefficients of the discretized Maxwell's equations at each voxel 205 or each simulation time step can become significant, and potentially even intractable depending upon the size of the physical device being simulated and the number of voxels 205 used to simulate the physical device. Accordingly, memory saving techniques may be used. On such technique may include performing a running Fast Fourier Transform on the discretized Maxwell equations for each voxel 205 and only storing a select number of frequency components of interest. This projection from the time domain into the frequency domain obviates the need to store results for each time step for each voxel, but rather maintains a running tally across all time steps (or at least across all time steps for a given revision iteration) for each voxel 205. As discussed above, an exponential decay may be used with the running Fourier series to reduce the influence of early design revisions in the iterative design process.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method of optimizing a design of a physical device, the method comprising:
receiving an initial description of the physical device that describes the physical device with an array of voxels that each describe one or more structural parameters of the physical device, the initial description further including a characterization of a desired input/output relationship including a desired output signal generated at an output region of the physical device in response to a source signal at a source region of the physical device;

forward simulating a field response extending from the source region in response to the source signal to the output region to generate a forward simulated output signal at the output region;

adjusting one or more structural parameter weights associated with one or more of the voxels with an adaptive algorithm configured to reduce an error between the forward simulated output signal and the desired output signal;

revising one or more of the structural parameters of one or more of the voxels based upon the adjusting;

iteratively repeating the forward simulating, the adjusting, and the revising; and generating a revised description of the physical device with one or more of the structural parameters optimized to reduce the error between the forward simulated output signal and the desired output signal compared to the initial description.

2. The computer implemented method of claim 1, wherein iteratively repeating the forward simulating, the adjusting, and the revising comprises:

forward simulating the field response after revising the one or more of the structural parameters for a number of time steps sufficient to allow influences from revisions of the one or more of the structural parameters to propagate to the forward simulated output signal at the output region before performing a next iteration of adjusting the one or more of the structural parameter weights.

3. The computer implemented method of claim 2, wherein the number of time steps is further dependent upon a resonance of the field response within the physical device.

4. The computer implemented method of claim 3, wherein the number of time steps is dependent upon transient responses in the forward simulated output signal relaxing below a threshold value.

5. The computer implemented method of claim 4, further comprising:

reducing the number of time steps between iterations as the resonance of the field response reduces while optimizing the design.

6. The computer implemented method of claim 2, wherein each of the time steps of the forward simulating corresponds to an amount of time for the field response to propagate across one or less of the voxels.

7. The computer implemented method of claim 1, further comprising:

reverse simulating a second field response stimulated in response to the desired output signal reverse propagated from the output region to the source region to generate a reverse simulated output signal at the source region;

additionally adjusting one or more of the structural parameter weights associated with one or more of the voxels with a second adaptive algorithm configured to reduce a second error between the reverse simulated output signal and the source signal;

additionally revising one or more of the structural parameters of one or more of the voxels based upon the additional adjusting; and iteratively repeating the reverse simulating, the additional adjusting, and the additional revising.

8. The computer implemented method of claim 1, further comprising:

combining the desired output signal with the forward simulated output signal to generate a reverse source signal;

reverse simulating a second field response stimulated in response to the reverse source signal back propagated from the output region to the source region to generate a reverse simulated output signal at the source region;

additionally adjusting one or more of the structural parameter weights associated with one or more of the voxels with a second adaptive algorithm configured to minimize the reverse simulated output signal at the source region;

additionally revising one or more of the structural parameters of one or more of the voxels based upon the additional adjusting; and iteratively repeating the reverse simulating, the additional adjusting, and the additional revising.

9. The computer implemented method of claim 1, wherein the field response comprises an electromagnetic field response, and wherein the structural parameters comprise one or more of a dielectric constant or a permeability value for each of the voxels.

10. The computer implemented method of claim 1, wherein the source signal and the desired output signal are differentiable fields, and wherein forward simulating the field response comprises applying a finite-difference time-domain method.

11. The computer implemented method of claim 1, wherein the adaptive algorithm comprises one of a recursive least squares algorithm or a least mean squared algorithm.

12. At least one machine-accessible storage medium that provides instructions that, when executed by a machine, will cause the machine to perform operations comprising:

receiving an initial description of a physical device that describes the physical device with an array of voxels that each describe one or more structural parameters of the physical device, the initial description further including a characterization of a desired input/output relationship including a desired output signal generated at an output region of the physical device in response to a source signal at a source region of the physical device;

forward simulating a field response extending from the source region in response to the source signal to the output region to generate a forward simulated output signal at the output region;

determining one or more structural parameter weights associated with one or more of the voxels with an adaptive algorithm configured to reduce an error between the forward simulated output signal and the desired output signal;

revising one or more of the structural parameters of one or more of the voxels based upon the determining;

iteratively repeating the forward simulating, the determining, and the revising; and generating a revised description of the physical device with one or more of the structural parameters optimized to reduce the error between the forward simulated output signal and the desired output signal compared to the initial description.

13. The least one machine-accessible storage medium of claim 12, wherein iteratively repeating the forward simulating, the determining, and the revising comprises:

forward simulating the field response after revising the one or more of the structural parameters for a number of time steps sufficient to allow influences from the revisions of the one or more of the structural parameters to propagate to the forward simulated output signal at the output region before performing a next iteration of determining the one or more of the structural parameter weights.

14. The least one machine-accessible storage medium of claim 13, wherein the number of time steps is further dependent upon a resonance of the field response within the physical device.

15. The least one machine-accessible storage medium of claim 14, wherein the number of time steps is dependent upon transient responses in the forward simulated output signal relaxing below a threshold value.

16. The least one machine-accessible storage medium of claim 15, further providing instructions that, when executed by the machine, will cause the machine to perform further operations, comprising:
changing the number of time steps between the iterations as the resonance of the field response changes between iterations of the repeating.

17. The least one machine-accessible storage medium of claim 13, wherein each of the time steps of the forward simulating corresponds to an amount of time for the field response to propagate across one, or a partial one, of the voxels.

18. The least one machine-accessible storage medium of claim 12, further providing instructions that, when executed by the machine, will cause the machine to perform further operations, comprising:
reverse simulating a second field response stimulated in response to the desired output signal reverse propagated from the output region to the source region to generate a reverse simulated output signal at the source region;
additionally determining one or more of the structural parameter weights associated with one or more of the voxels with a second adaptive algorithm configured to reduce a second error between the reverse simulated output signal and the source signal;
additionally revising one or more of the structural parameters of one or more of the voxels based upon the additional determining; and
iteratively repeating the reverse simulating, the additional determining, and the additional revising.

19. The least one machine-accessible storage medium of claim 12, further providing instructions that, when executed by the machine, will cause the machine to perform further operations, comprising:
combining the desired output signal with the forward simulated output signal to generate a reverse source signal;
reverse simulating a second field response stimulated in response to the reverse source signal back propagated from the output region to the source region to generate a reverse simulated output signal at the source region;
additionally determining one or more of the structural parameter weights associated with one or more of the voxels with a second adaptive algorithm configured to minimize the reverse source signal output at the source region;
additionally revising one or more of the structural parameters of one or more of the voxels based upon the additional determining; and
iteratively repeating the reverse simulating, the additional determining, and the additional revising.

20. The computer implemented method of claim 12, wherein the field response comprises an electromagnetic field response, and wherein the structural parameters comprise one or more of a dielectric constant or a permeability value of the voxels.

21. The computer implemented method of claim 12, wherein the adaptive algorithm comprises one of a recursive least squares algorithm or a least mean squared algorithm.

22. A computer implemented method, the method comprising:
receiving an initial description of a physical device that describes the physical device with a three-dimensional (3D) array of voxels that each describe one or more structural parameters of the physical device at a respective local in 3D space, the initial description further including a desired output signal generated at a first region of the physical device in response to a source signal at a second region of the physical device;
simulating a field response to generate a simulated output signal at the first region;
revising one or more of the structural parameters of one or more of the voxels while simulating the field response, wherein the revising is based upon an adaptive algorithm configured to reduce an error between the simulated output signal and the desired output signal;
iteratively repeating the simulating and the revising; and
generating a revised description of the physical device with one or more of the structural parameters optimized to reduce the error between the simulated output signal and the desired output signal compared to the initial description.

* * * * *